A. DUDGEON.
SAW SET AND JOINTER.
APPLICATION FILED SEPT. 17, 1913.
1,090,035.
Patented Mar. 10, 1914.
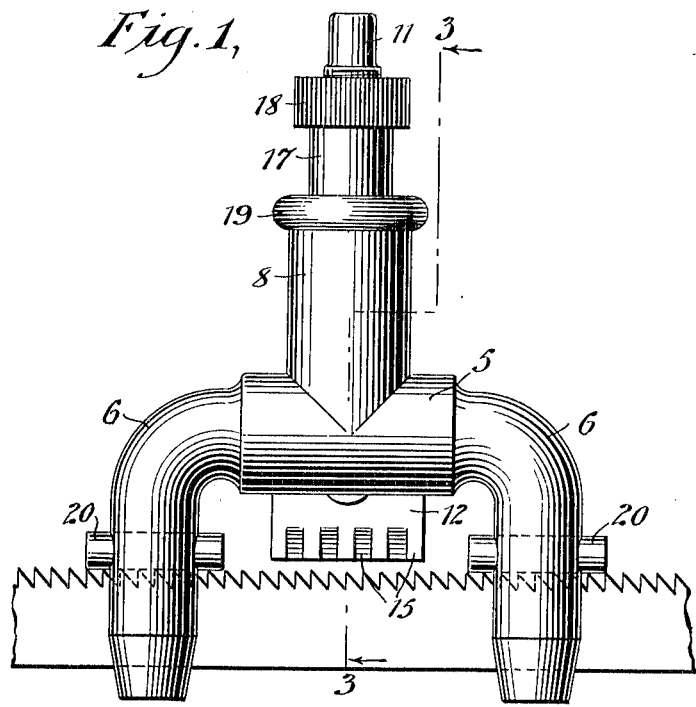
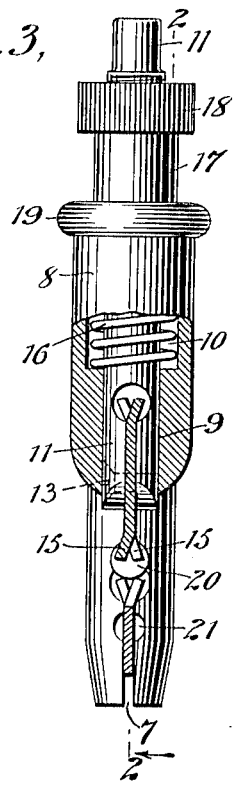
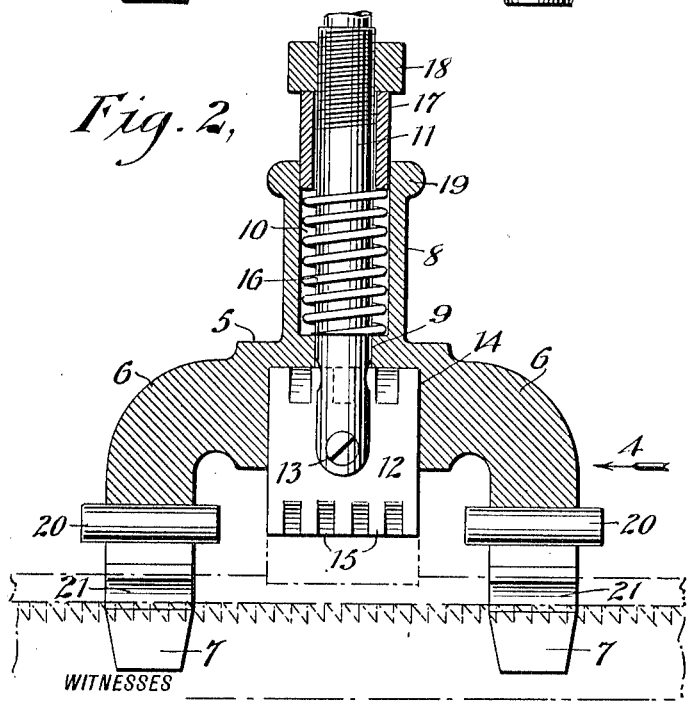
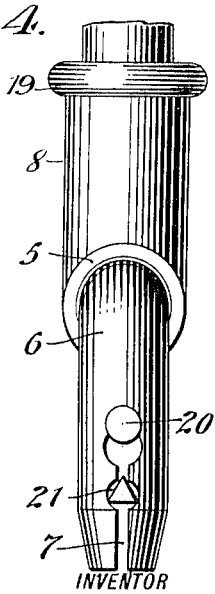
WITNESSES
Edw. Thorpe
B. Joffe
INVENTOR
Addelbert Dudgeon
BY
Munn & Co.
ATTORNEYS

UNITED STATES PATENT OFFICE.

ADDELBERT DUDGEON, OF LATROBE, PENNSYLVANIA.

SAW SET AND JOINTER.

1,090,035.

Specification of Letters Patent. Patented Mar. 10, 1914.

Application filed September 17, 1913. Serial No. 790,190.

*To all whom it may concern:*

Be it known that I, ADDELBERT DUDGEON, a citizen of the United States, and a resident of Latrobe, in the county of Westmoreland and State of Pennsylvania, have invented a new and Improved Saw Set and Jointer, of which the following is a full, clear, and exact description.

My invention relates to improvements in saw sets and jointers, and has reference more particularly to a device comprising a member having a bifurcated end adapted to engage a saw, and a plunger carrying a tooth bit whereby the saw teeth are set.

An object of the invention is to provide a simple, strong and inexpensive saw set and jointer which will set a number of teeth at a time, in which the tooth bit can set different sizes of saw teeth, and in which the motion of the setting tool is adjustable and which, also, is adapted to receive a file for jointing the saw.

The invention consists of the construction and combination of parts to be more fully described hereinafter and fully set forth in the claims.

Reference is to be had to the accompanying drawings forming a part of this specification, in which like characters indicate corresponding parts in all the views and in which:

Figure 1 is a side elevation of an embodiment of my invention; Fig. 2 is a section on line 2—2, Fig. 3; Fig. 3 is a section on line 3—3, Fig. 1; and Fig. 4 is an end view of the bifurcated end in the direction of the arrow 4 shown in Fig. 2.

Referring to the drawings, 5 represents the main body or member having a bifurcated end the portions 6 of which are preferably circular and provided with slots 7 in alinement and central with the main body. The main body 5 has its other end 8, which is central with the bifurcated end, provided with a bore 9, the upper portion 10 of which is enlarged. The bore 9 receives a plunger 11, one end of which projects into the bifurcated end and is slotted to receive a tooth bit 12, preferably rectangular shaped and made of tungsten steel and secured to the slotted end of the plunger by means of a screw 13. The main body 5 is provided with a recess 14 which forms a guide for the rectangular tooth bit 12. The tooth bit, which is formed on the blank, has its upper and lower edges slit, thereby forming rectangular-shaped teeth 15 which are alternately deflected in opposite directions. The distance between the slots on one edge being different from the distance between the slots on the opposite edge, the two edges will form different numbers of teeth, whereby different sizes of saw teeth can be set.

The upper portion 10 of the bore receives a coil spring 16 engaging the plunger 11. Bearing against the spring and engaging the plunger is a ring 17. The upper end of the plunger projecting out of the main body 5 is threaded and receives a nut 18 by means of which the tension of the spring 16 can be varied, and, therefore, the distance between the nut 18 and the collar 19 on the end 8 of the member 5 can be varied. The variation of this distance regulates the setting of the teeth on the saw, as will appear hereinafter. The slotted ends 7 of the main body receive steel pins 20 in alinement with each other and adapted to come in contact with the teeth of the saw when the saw is set. See Fig. 1. These slotted ends are also provided with alining apertures 21 adapted to receive a triangular file whereby the saw is jointed, as will appear hereinafter.

The use of my device is as follows: A saw to be set is engaged by the slots 7 of the bifurcated end of the member 5 with the steel pins 20 resting on the top of the teeth. The number of teeth per inch on the saw being known, a tooth bit having the same number of teeth per inch is inserted from the side into the slot of the plunger 11 and secured to the plunger by means of the screw 13. The plunger is then placed in the bore 9, the spring 16, the ring 17 and nut 18, are placed on to the plunger and the distance between the end and the collar 19 of the end 8 of the member 5 is adjusted for the desired degree of setting. Any kind of a support is then placed under the saw, and by striking the upper end of the plunger, so as to make the nut strike the collar 19, the teeth are set, and the number of teeth set per each blow depends on the number of teeth on the tooth bit. After each blow the tool is advanced through the number of teeth set per blow. It can be easily seen that no special tool is necessary for maintaining the saw straight, as the slots in the bifurcated ends prevent the saw from moving. Furthermore, in view of the fact that a number of teeth is set per blow, the setting is very rapid and uniform, due to the adjustment of the plunger motion and also the guiding of the tooth bit by the main body.

When a saw is to be jointed, a triangular file is fitted into the apertures 21, as shown in Fig. 4, with the nut 18 screwed off, so as to let the teeth 15 of the tooth bit 12 come in engagement with the file and maintain the same in proper position in the apertures 21 while the saw is jointed. See dotted lines in Fig. 2.

It is understood that a number of tooth bits can be provided for a tool, so as to permit the setting of a large number of saws having a different number of teeth per inch of length.

Having thus described my invention, I claim as new and desire to secure by Letters Patent:

1. In a device of the class described, a member having a bifurcated end adapted to engage a saw; a plunger in the member; a toothed bit in the bifurcated end carried by the plunger; means for maintaining said plunger in a predetermined position; and means for varying the length of the plunger's motion.

2. In a device of the class described, a member having a bifurcated end adapted to engage a saw; a plunger in the member; a tooth bit within the bifurcated end and carried by said plunger, said member having means for guiding said tooth bit; resilient means for maintaining said plunger in a predetermined position; and means for varying the length of the plunger's motion.

3. In a device of the class described, a member having a bifurcated end adapted to engage a saw; a tooth bit in the bifurcated end mounted to move therein; means for maintaining said bit in a predetermined position; and means for adjusting the movement of said bit substantially as and for the purpose set forth.

4. In a device of the class described, a member having a bifurcated end, said bifurcated end having alining slots adapted to engage a saw and alining apertures adapted to receive a file; a plunger in said member; a tooth bit within said bifurcated end in alinement with the slots and carried by said plunger; a resilient member for maintaining said plunger in a normal position; and means on said plunger coacting with said member whereby the displacement of said plunger may be varied.

5. In a device of the class described, a member having a bifurcated end, said end having alining slots adapted to receive a saw and alining apertures in said slots adapted to receive a file, said member having a central bore the axis of which is in a plane with the alining slots; a plunger in said bore; a tooth bit within said bifurcated end in alinement with said slots and secured to said plunger, said tooth bit being formed of a blank the edges of which are slit forming teeth alternately deflected in opposite directions, said member having a recess for guiding said tooth bit; a coil spring in said bore; a ring on said plunger engaging said coil spring; and a nut threaded to said plunger and whereby the length of motion of said plunger with the bit may be varied, substantially as and for the purpose set forth.

In testimony whereof I have signed my name to this specification in the presence of two subscribing witnesses.

ADDELBERT DUDGEON.

Witnesses:
 JOHN V. TONER,
 P. C. TONER.